July 8, 1969     H. W. BULTHUIS ET AL     3,454,773
BINOCULAR NIGHT TELESCOPE WITH SINGLE IMAGE TUBE
Filed March 24, 1966     Sheet 3 of 4

INVENTORS
HENRICUS Wilhelmus BULTHUIS
ABRAHAM GROENEWEG
BY
Arthur B. Colvin
ATTORNEY

United States Patent Office 3,454,773
Patented July 8, 1969

1

3,454,773
BINOCULAR NIGHT TELESCOPE WITH SINGLE IMAGE TUBE
Henricus Wilhelmus Bulthuis, The Hague, and Abraham Groeneweg, Slikkerveer, Netherlands, assignors to N.V. Optische Industrie de Oude Delft, Delft, Netherlands, a Netherlands corporation
Filed Mar. 24, 1966, Ser. No. 537,107
Claims priority, application Netherlands, Mar. 26, 1965, 6503866
Int. Cl. H01j 31/50
U.S. Cl. 250—213   6 Claims

ABSTRACT OF THE DISCLOSURE

The invention relates to a binocular night telescope with a single image tube in which the front objective forming the image on the photo cathode of the image tube, the image tube itself and a collimation objective having its focal plane in the image screen of the image tube are positioned in a central tubular part of the telescope, a binocular viewing system being provided which comprises, in addition to said collimation objective, a binocular telescope each half of which receives a portion of the parallel beams leaving the collimation objective. The notion "image tube" in this specification is meant to include both the image converter which converts an invisible, e.g. infrared image on the photocathode into a visible image on the output screen, and the image intensifier whose photocathode image is formed partly or completely by visible radiation.

As conducive to an understanding of the invention, it is noted that night telescopes with a single image tube and binocular viewing system can have important advantages as regards price, weight and maintenance over similar telescopes with separate front objectives and image tubes for both eyes. They avoid the drawback that the observer may have difficulty in fusing the two images if the image tubes, as it often occurs, have not exactly equal magnifications and/or light intensifications.

For the binocular viewing of the image screen in single tube telescopes it is advantageous to use the particular viewing system indicated above. By using a high relative aperture collimation objective a considerable magnification and full coverage of both eye pupils can be secured, whereas the use of semi-transparent reflectors as beam splitters that would entail serious light losses is avoided.

In such viewing systems usually prism systems of some kind have to be provided in order to arrange the eye piece axes at the proper interpupillary distance, to invert the image, etc. A disadvantage of this type of viewing systems is their long light path which may result in a considerable increase in overall length of the telescope if compared to double tube telescopes using only a pair of magnifiers as the viewing system. This draw-back counts particularly for hand held telescopes.

It is an important object of the present invention to provide a binocular night telescope of the type indicated hereinbefore, which is very compact and can easily be used as a hand held telescope.

According to the invention, each of the telescope halves of the viewing system comprises two 90° prisms, one of which is disposed on the exit side of the collimation objective, so as to reflect the optical axis back parallel to the axis of the central tubular part, the second prism being arranged alongside the central tubular part so as to re-reflect the optical axis into the original direction, the objectives of the telescope halves being disposed

2 between the two prisms and the eye pieces being so disposed in the optical paths on the exit side of the second prisms that the exit pupils of the eye pieces are located beyond the plane defined by the exit end of the central tubular part.

In a preferred embodiment to be described in detail hereinafter the two prisms in each telescope half are arranged cross-wise so as to form a Porro prism system of the first type.

Figure 1:
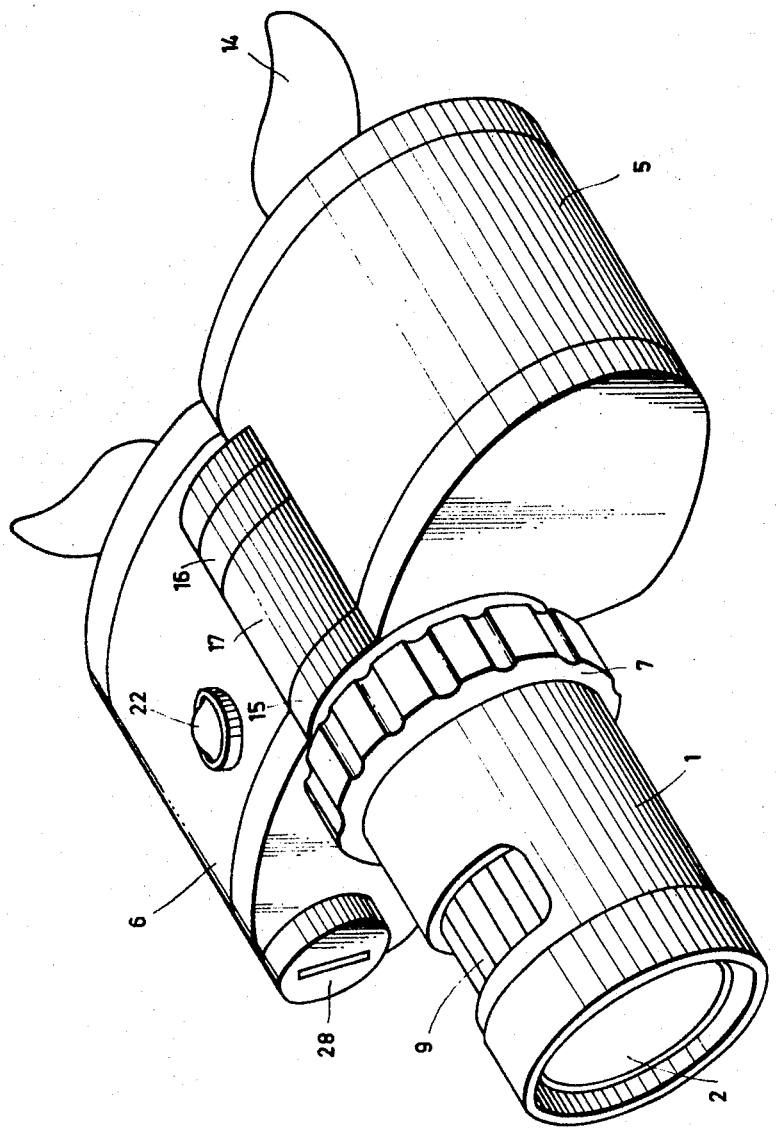
FIG. 1 is a perspective view of the embodiment to be described.

The night telescope shown consists of a central tubular part 1 in which the front objective 2, the image tube 3 and the collimation objective 4 are accommodated in alignment with one another, and two wings 5 and 6, hereinafter to be referred to as telescope housings, since they contain a.o. the two halves of the telescope forming part of the viewing system. The front portion of the central tube 1 receiving the front objective 2 is interchangeable by means of a swivel ring 7, whereas focusing of the objective 2 on the photo cathode 8 of the image tube 3 is brought about by the aid of a notched ring 9.

Figure 2:
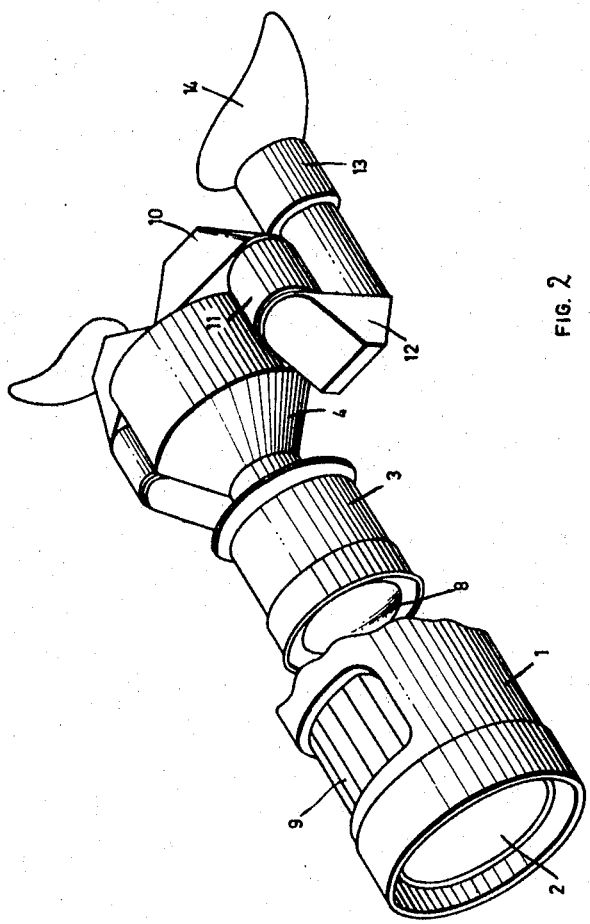
FIG. 2 is a similar view, certain parts of the housing being omitted in order to show the optically active parts.
Figure 3:
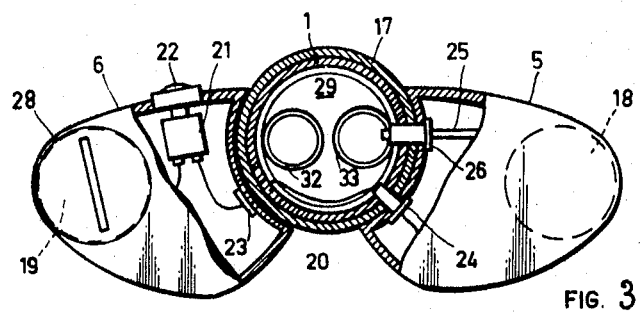
FIG. 3 is a partial transverse cross-sectional view of the telescope.

In addition to the collimation objective 4 the viewing system comprises a binocular prism telescope of which FIG. 2 clearly shows one-half (solely the parts of this half carry reference numbers). This telescope half consists of a 90° prism 10, an objective 11, a 90° prism 12 and an eye piece 13 with eye shell 14. The other telescope half has a similar construction.

Figures 5, 6:
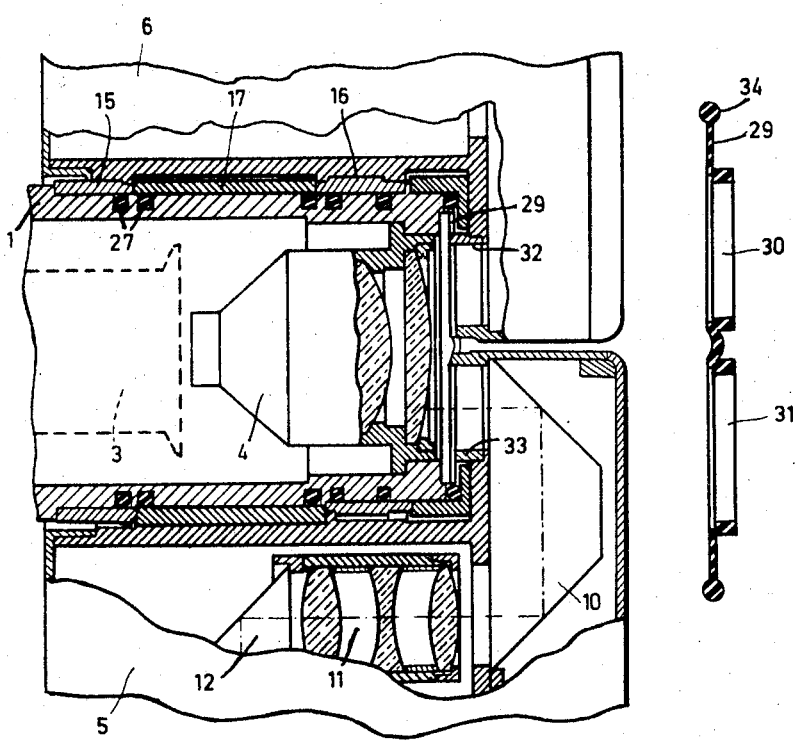
FIG. 5 is a partial longitudinal cross-sectional view.
FIG. 6 is a cross-section of a sealing membrane.

As seen best in FIG. 5 prism 10 receives a portion of the parallel beams leaving the collimation objective 4 and reflects this portion back to the objective 11. This objective focuses these beams in the focal plane of eye piece 13, thus forming an image of the whole output screen image of tube 3, and prism 12 again bends the optical axis twice through 90° such that the optical axis re-attains its original direction. In FIG. 5 the prism 12 is shown rotated through 90°, for the sake of clarity. In reality, the edges of prisms 10 and 12 will cross each other at right angles, so that the prisms in effect form a Porro prism system of the first type. Thus, the number of consecutive image inversals occurring in the complete instrument is four, i.e. first by the front objective, then by the image tube, henceforth by the telescope objective 11, and finally, by the Porro system 10, 12. Therefore, the night telescope will produce an image having the correct orientation.

As a result of the objective 11 being positioned between the first and the second prism of the inverting system, this objective and the prism 12 will be mounted alongside the central tubular part of the night telescope. Accordingly, the instrument can have an extremely short overall length, and the necessary interpupillary distance between the eye piece axes is secured in a simple manner. The eye pieces generally will have to extend only a short distance beyond the plane defined by the roof edges of the first prisms. However, the exit pupils of the eye pieces must necessarily be located behind the rear end of the central tube to enable the observer to place his eyes at that location.

With binocular telescopes it is of course desirable to provide for the adaptability within certain limits of the distance between the eye piece axes to the interpupillary distance of the observer. To that end, in the telescope according to the invention, the halves of the prism telescope could be turned about the axes of the beams entering them. Preferably, however, at least one of the telescope halves of the viewing system is made rotatable, as an entity, about the axis of the central tubular part 1. Through, in that case, the entrance aperture of the respective telescope half is made to move through the beam leaving the collimation objective 4, it will still go on to receive partial beams originating from all points of the image screen. An advantage of this particular method to vary the interpupillary distance consists in that the attachment of the adjustable telescope half or halves to the central tube can be made very simple and sturdy, viz. by journaling the telescope housing in which the respective telescope half is accommodated on the central tubular part by means of one or more rings secured to the telescope housing. Furthermore, no space has to be left between the central tube and the movable telescope housing in order to avoid that the central tube would block the adjustment, as would be necessary in the case of a rotation about the axis of the entering beam. This, again, enables a more compact arrangement to be achieved.

In the embodiment illustrated solely the telescope housing 6 is rotatable about the tube 1. The housing 6 is secured, e.g. by means of screws not shown, to a pair of journal rings 15 and 16 disposed around tube 1 (FIG. 5). The other telescope housing 5 is also secured to a ring 17, however, the latter ring is not free to rotate about the central tube 1. By the aid of a notch, not shown, on one of the rings 15, 16, the effective angle of rotation of the housing 6 can be limited.

Figure 4:
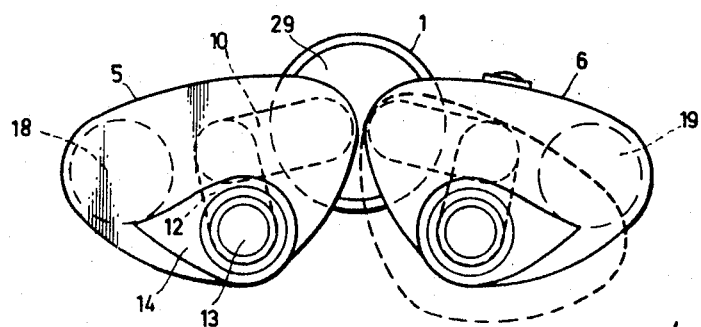
FIG. 4 is an elevational view from the side of the eye pieces.

FIG. 4 is partly a cross-sectional view of the night telescope through the ring 17, and partly an elevational view from the object side. Image tube 3 and collimation objective 4 have been omitted for clarity. From FIGS. 4 and 5 the shape of the telescope housing may be seen. Both housings have a projecting portion extending over the end face of the central tube 1 and accommodating the first Porro prism. Further, the housing 5 and 6 have a cylindrically rounded outer portion receiving, respectively, a high voltage generator for the image tube accommodated in an elongated cylindrical envelope 18, and an electric battery 19 with certain auxiliary parts such as a voltage stabilizer. The battery supplies current to the high voltage generator through a flexible insulated lead 20 which can be interrupted by a switch 21 operated by a push-button 22. By unscrewing a cap 28 the battery 19 can be changed.

To permit passage of lead 20 into the central tube 1 coaxial holes have been provided in the wall of housing 6 and the ring 15, receiving an insulating socket 23, whereas tube 1 has a slit opposite the said holes so as to permit rotation of the housing 6. Through a similar insulating socket 24 the lead 20 enter the housing 5 on its way to the high voltage generator.

The high voltage from generator 18 is applied to the image tube through an insulated lead 25 passing the tubelet 26. It is an advantage that the high voltage lead 25 is prevented to move during adjustment of the interpupillary distance due to the housing 5 being rigidly attached to the central tube 1, since this reduces the risk of an electrical break-down to the minimum. The shape of the telescope housings and the small overall dimensions warrant that the instrument can be easily manipulated notwithstanding the fact that it is a complete self-contained unit independent from outside current supplies.

It is important to protect the interior of the telescope against the penetration of moisture. To that end, well-known methods can be applied such as mounting elastic sealing rings (such as 27 in FIG. 5), providing suitable plastic sealing materials on screws, covers of the telescope housing, etc. A special problem, however, is the sealing of the rear end of the central tubular part, as this should not prevent the eccentric rotation of at least one of the telescope housings. According to the invention this problem can be solved in a very simple and efficient manner by providing an elastic membrane 29 (see FIGS. 5 and 6) which covers the rear end of the central tubular part 1. The membrane is clamped along its circumference and has two eccentric openings 30 and 31 for receiving two rings 32 and 33 through which the light beams for the two telescope halves leave the central tubular part 1, and which rings are connected in a light- and moisture-tight manner to the respective telescope housings 5 and 6. Though the membrane, which is made e.g. of rubber, is of course slightly deformed by the eccentric movement of the rings 32 and 33, it will always surround the rings tightly provided that a certain pre-stretch has been applied to the openings in the membrane during their mounting. In order to further reduce the risk of leakage the membrane may be provided with collars surrounding the openings 30 and 31 and a thick edge, as indicated in FIG. 6.

What we claim is:

1. A binocular night telescope with a single image tube, in which the front objective forms the image on the photo cathode of the image tube, the image tube itself and a collimation objective having its focal plane in the image screen of the image tube, being positioned in a central tubular part of the telescope, a binocular viewing system being provided which comprises, in addition to said collimation objective, a binocular telescope, each half of which receives a portion of the parallel beams leaving the collimation objective, characterized in that each of the telescope halves of the viewing system comprises two 90° prisms, whereby the light beams of the two telescope halves of the viewing system will each be deviated a number of times in such manner that the exit pupils of these telescope halves lie relatively close to and behind the plane defined by the rear end of the central tubular part, the housings of the telescope halves extending for a substantial part of their length alongside the central tubular part, at least one of these housings being journalled on said tubular part by means of one or more rings fixed to said housing and receiving said tubular part.

2. A binocular night telescope as claimed in claim 1, characterized in that in the telescope housing which is journalled on said tubular part there is provided a source of potential for the image tube, one or more flexible current leads entering the central tubular part through suitable passage means, which passage means are situated in the space defined by a pair of axially spaced circumferential sealing rings between the central tubular part and one of the journal rings, to thereby provide a moisture and airtight sealing of the passage means.

3. Binocular night telescope as in claim 1, wherein the two prisms in each half of the telescope in the viewing system are arranged crosswise so as to form a Porro prism system of the first type.

4. Binocular night telescope as in claim 1, wherein the two halves of the telescope in the viewing system are accommodated in telescope housings which are mounted on opposite sides of the central tubular part, one of said telescope housings further receiving a high voltage generator for the image tube enclosed in an elongated cylindrical envelope, and the other telescope housing receiving an electric battery as the current source for said high voltage generator.

5. Binocular night telescope as in claim 4, wherein the telescope housing receiving the battery is rotatable, whereas the telescope housing containing the high voltage voltage generator is rigidly attached to the central tubular part, a slit being provided to provide passage for one or more flexible leads through which current is supplied to the high voltage generator.

6. Binocular night telescope as in claim 1, wherein the central tubular part at its exit end is sealed by means of an elastic membrane which is clamped along its circumference and has two eccentric openings for receiving the rings through which the light beams for the two telescope halves leave the central tubular part, said rings being connected light and moisture tight to the respective telescope housings.

References Cited

UNITED STATES PATENTS

| | | | |
|---|---|---|---|
| 584,976 | 6/1897 | Abbe | 350—51 |
| 1,397,156 | 11/1921 | Baumann | 350—51 |
| 1,470,670 | 10/1923 | Heimstadt | 350—35 |
| 2,323,787 | 7/1943 | Bitner | 350—51 |
| 2,970,220 | 1/1961 | Bouwers | 250—213 |

RALPH G. NILSON, *Primary Examiner.*

MARTIN ABRAMSON, *Assistant Examiner.*

U.S. Cl. X.R.

250—83.3